US012722063B2

(12) United States Patent
Aggarwal

(10) Patent No.: US 12,722,063 B2
(45) Date of Patent: Sep. 1, 2026

(54) CourtAI: SYSTEM AND METHOD FOR TENNIS PERFORMANCE IMPROVEMENT AND INJURY PROTECTION USING ARTIFICIAL INTELLIGENCE WITH INSTANT FEEDBACK AND DYNAMIC TRAINING PLANS

(71) Applicant: Aadit Aggarwal, Bothell, WA (US)

(72) Inventor: Aadit Aggarwal, Bothell, WA (US)

( * ) Notice: Subject to any disclaimer, the term of this patent is extended or adjusted under 35 U.S.C. 154(b) by 387 days.

(21) Appl. No.: 18/462,406

(22) Filed: Sep. 7, 2023

(65) Prior Publication Data

US 2025/0083020 A1 Mar. 13, 2025

(51) Int. Cl.

| | |
|---|---|
| ***A63B 69/38*** | (2006.01) |
| ***A63B 24/00*** | (2006.01) |
| ***A63B 69/00*** | (2006.01) |
| ***G06V 40/20*** | (2022.01) |

(52) U.S. Cl.

CPC .......... *A63B 69/38* (2013.01); *A63B 24/0003* (2013.01); *A63B 69/0017* (2013.01); *G06V 40/23* (2022.01); *A63B 2220/806* (2013.01)

(58) Field of Classification Search

CPC ..... A63B 69/38; A63B 24/0003; G06V 40/23

USPC .......................................................... 473/459

See application file for complete search history.

(56) References Cited

U.S. PATENT DOCUMENTS

| | | | | |
|---|---|---|---|---|
| 2019/0347956 | A1* | 11/2019 | Daga | G16H 40/67 |
| 2019/0388791 | A1* | 12/2019 | Lapoint | A63F 13/327 |
| 2021/0153814 | A1* | 5/2021 | DeMazumder | G16H 10/60 |
| 2022/0080263 | A1* | 3/2022 | Brush | G16H 40/67 |
| 2023/0372804 | A1* | 11/2023 | Meloy | A63B 71/03 |
| 2025/0013209 | A1* | 1/2025 | Khare | A01K 29/005 |
| 2025/0181420 | A1* | 6/2025 | Talavera | G06F 9/5083 |
| 2025/0312680 | A1* | 10/2025 | Mooney | G06V 40/10 |

* cited by examiner

*Primary Examiner* — Allyson N Trail

(57) ABSTRACT

CourtAI introduces an innovative approach to overcome several limitations associated with traditional coaching methods. Leveraging AI technology, the system meticulously analyzes player movement patterns, speed, and gameplay actions to formulate personalized game strategies and pinpoint areas for improvement. Advanced tracking software is integrated to observe the ball, racket, and player's movements, speed, and posture, providing immediate feedback for on-the-spot performance assessment during practice. Additionally, the system curates personalized training agendas and dynamically adjusts them based on real-time player performance. It enhances the training experience by delivering voice feedback, creating a more engaging learning environment. Moreover, CourtAI implements mechanisms to proactively address potential injuries by closely monitoring player actions.

9 Claims, 7 Drawing Sheets

Block diagram of claim 1 showing AI-Powered Tracking IoT Device with Capture, Process, Instant Feedback, and Connection modules.

Block diagram of claim 1 showing AI-Powered Tracking IoT Device with Capture, Process, Instant Feedback, and Connection modules.

Block diagram of claim 3 with embodiment 1, 2, 3, 4, and 5 that includes a Screen module.

Block diagram of claim 4 with embodiment 1, 2, 3, 4, and 6 that includes an Audio component.

Block diagram of claim 5 with embodiment 1, 2, 3, 4, 5, 6, and 7 that includes mobile application to analyze the videos.

Block diagram of claim 6 with embodiment 1, 2, 3, 4, 5, 6, 7, 8, and 9 that includes mobile application to prepare and send training plans.

Block diagram of claim 7 with embodiment 1, 2, 3, 4, 5, 6, 7, 8, and 9 that includes sending the training plans be sent back to ball machine for execution Block diagram of claim 8 with embodiment 7, 8, and 9 that includes mobile app, cloud, and user interaction for videos uploads and plan/recommendations downloads

CourtAI: SYSTEM AND METHOD FOR TENNIS PERFORMANCE IMPROVEMENT AND INJURY PROTECTION USING ARTIFICIAL INTELLIGENCE WITH INSTANT FEEDBACK AND DYNAMIC TRAINING PLANS

FIELD

This invention relates to the field of racket sports training technologies, particularly in tennis, table tennis, and badminton. It involves a ball machine robot integrated with artificial intelligence. The invention provides real-time performance analysis, immediate feedback, and personalized dynamic training plans. These features aim to enhance individual performance and mitigate the risk of injuries during practice sessions with the ball machine.

BACKGROUND

Traditional racket coaching relies heavily on the presence of a professional coach to observe and guide players. However, these conventional methods often fall short in delivering affordable, personalized, and data-driven training—especially for individuals without regular access to a private coach. Additionally, the quality of coaching is limited by the coach's expertise and capabilities. Existing technologies in this domain lack a comprehensive real-time analysis of player movements, ball dynamics, and racket positioning. Furthermore, they do not provide immediate feedback during practice sessions to enhance performance and prevent injuries.

SUMMARY

This invention offers an alternative, affordable, accurate, and more sustained and consistently available coaching solution for players practicing with the ball machine in any racket sport, including tennis, badminton, and table tennis. Utilizing artificial intelligence, the invention conducts a comprehensive real-time analysis of player movements, ball dynamics, and racket positioning. This analysis enables the system to provide immediate feedback during practice sessions, enhancing performance and preventing injuries.

The following embodiments describe various aspects and configurations of the CourtAI system, highlighting its unique features and functionalities as detailed in the accompanying patent invention.

Embodiment 1: AI-Powered Tracking IoT Device-Capture Module

An embodiment of the invention incorporates a tracking IoT (Internet of Things) device powered by Artificial Intelligence (AI). The capture module of this device is designed to record real-time video and sensor data during a game, monitoring player movements, racket position, and ball speed and trajectory.

Embodiment 2: AI-Powered Tracking IoT Device-Process Module

An embodiment of CourtAI includes a mechanism for analysis, a module integrated into the IoT device. This module is specifically designed to analyze real-time video data, offering actionable feedback on player performance and identifying potential injury risks.

Embodiment 3: AI-Powered Tracking IoT Device-Instant Feedback Module

An embodiment of CourtAI features instant feedback mechanism, a module part of IoT device, that gives players real-time evaluations on a scale of 1-10 for various performance metrics. This feedback is presented visually on a screen and audibly through a speaker system, enhancing the learning process and assisting players in refining their techniques. This immediate feedback empowers users to make real-time improvements during the game, accelerating skill development at a rapid pace.

Embodiment 4: AI-Powered Tracking IoT Device-Connection Module

An embodiment of CourtAI includes a connectivity mechanism, a module integrated into the IoT device that interfaces with the mobile application. This functionality enables the system to receive training plans from the application and transmit them to the ball machine for execution.

Embodiment 5: AI-Powered Tracking IoT Device-Screen Module

The screen is an integral part of the AI-Powered Tracking IoT Device, serving as a visual display for recommendations. It enables users to view gameplay analysis details and provides specific information on feedback.

Embodiment 6: AI-Powered Tracking IoT Device-Audio Module

An embodiment of the invention includes a voice feedback system integrated into the AI-Powered Tracking IoT Device. The audio speaker, a component of this device, announces recommendations. This system facilitates interactive coaching during practice sessions, with AI-generated voice commands guiding players, providing tips, and offering encouragement based on analyzed data.

Embodiment 7: Mobile Application and Cloud Integration

In this embodiment, the invention incorporates a mobile application that seamlessly connects to a cloud-based system. The app is purpose-built to process and analyze player data, presenting it in an easy-to-understand format. Additionally, it generates personalized training plans based on the analyzed data. The cloud-based system facilitates deep analysis, pattern recognition, and long-term trend identification.

Embodiment 8: Dynamic Training Plans

The Dynamic Training Plans Software module embodiment emphasizes the system's capability to automatically generate and adapt dynamic training plans. Utilizing AI analysis of player performance data and predefined goals, these plans are continuously adjusted to ensure challenging and effective training sessions.

Embodiment 9: Cloud-Based Deep Analysis

In this embodiment, CourtAI utilizes a cloud-based system for in-depth analysis of player performance data. The cloud infrastructure facilitates extensive data processing, enabling the system to identify long-term performance trends and patterns, providing valuable insights for players.

DETAILED DESCRIPTION

Figure 1:
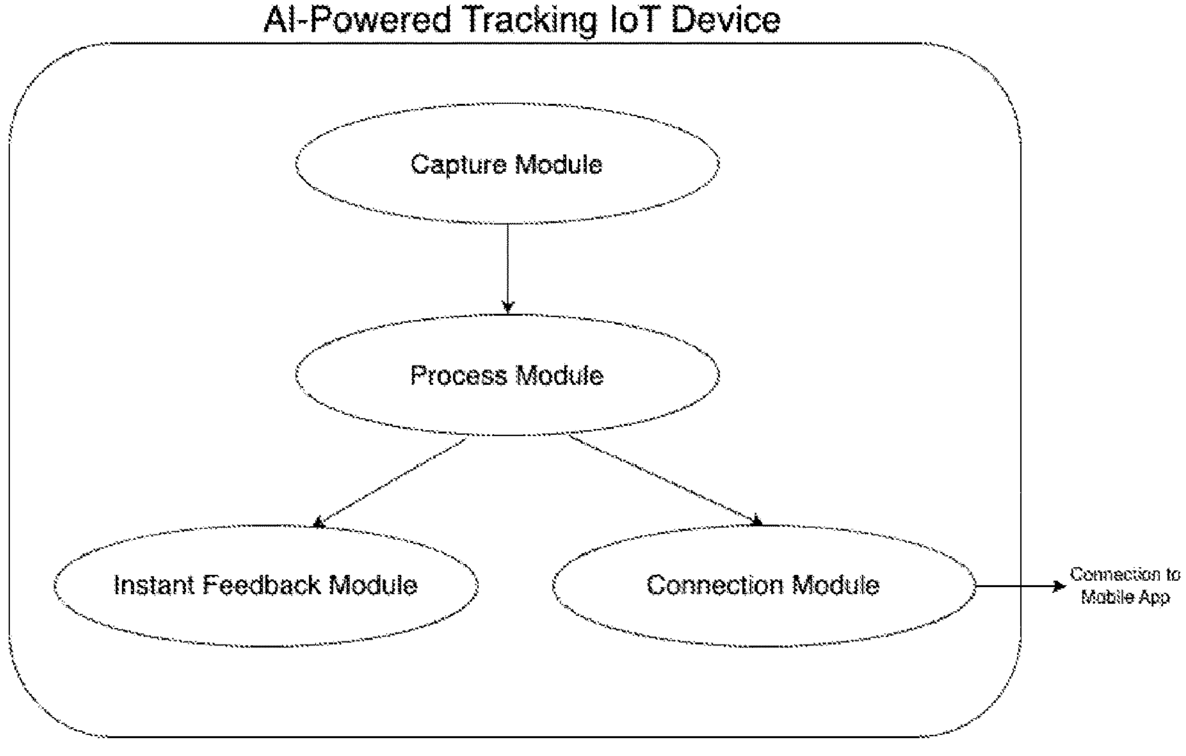
FIG. 1 is a block diagram of claim 1 with embodiment 1, 2, 3, and 4 showing AI-Powered Tracking IoT Device with Capture. Process, Instant Feedback, and Connection modules.
Figure 2:
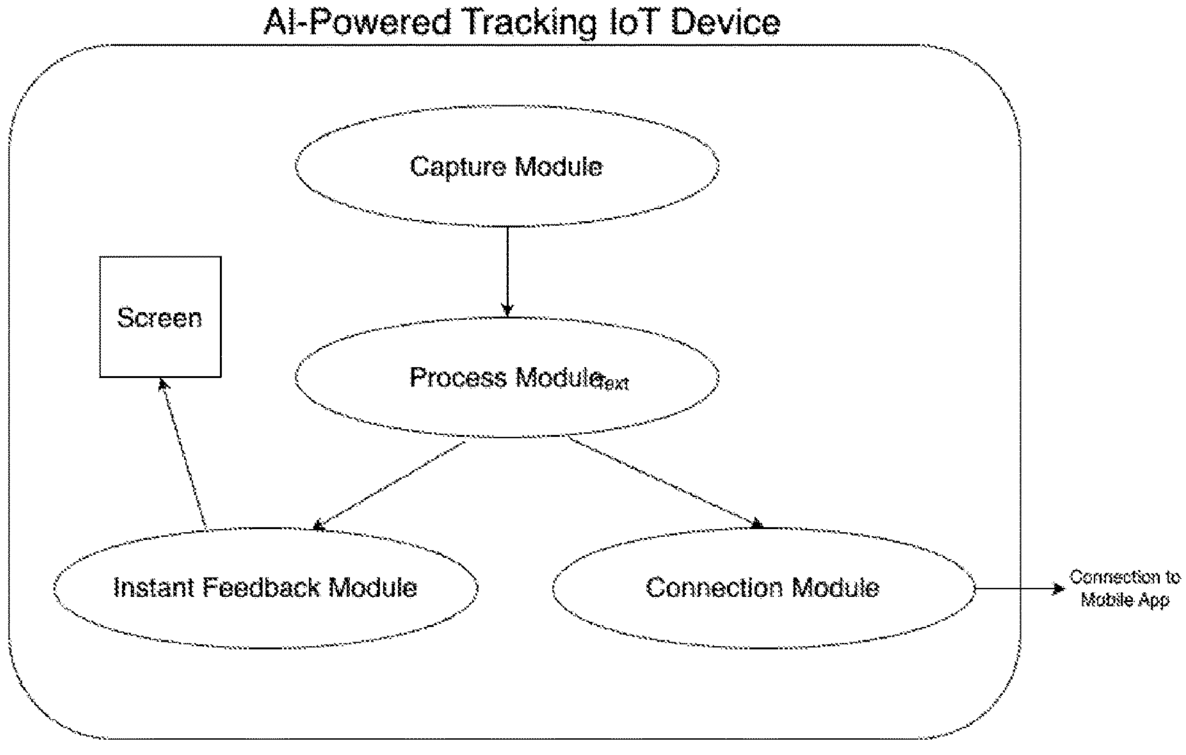
FIG. 2 is a block diagram of claim 3 with embodiment 1, 2, 3, 4, and 5 that includes a Screen component.
Figure 3:
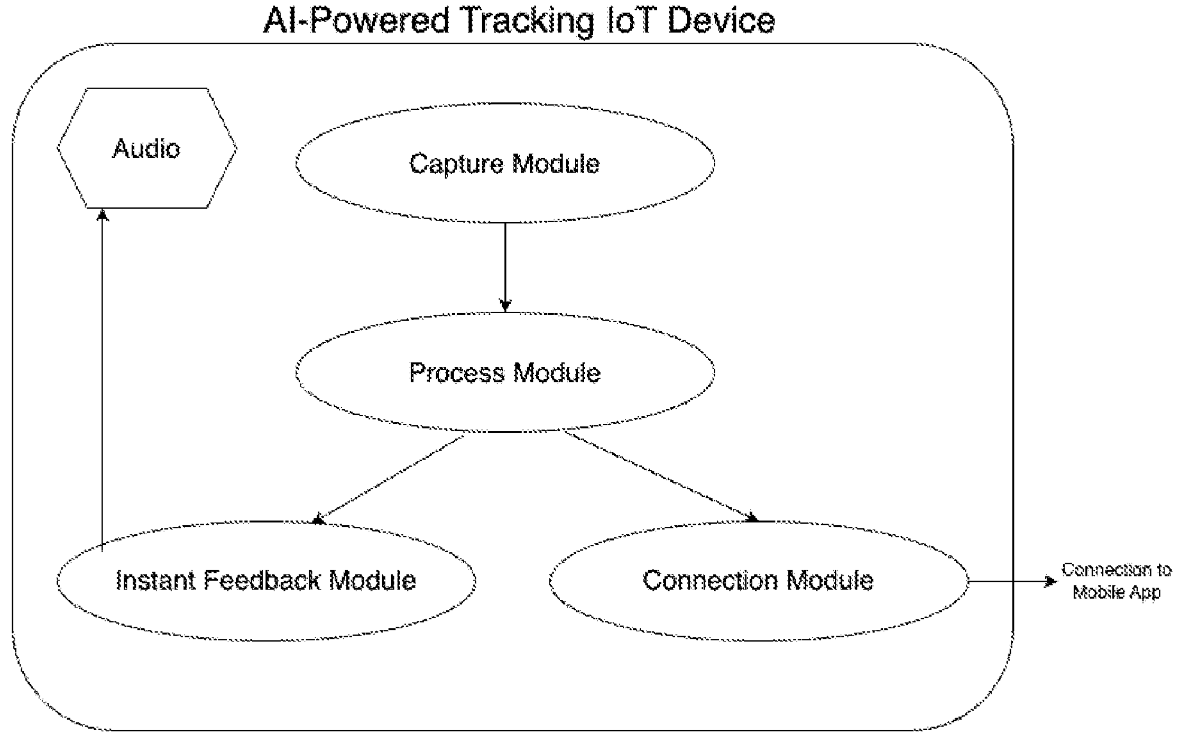
FIG. 3 is a block diagram of claim 4 with embodiment 1, 2, 3, 4, and 6 that includes an Audio component.
Figure 4:
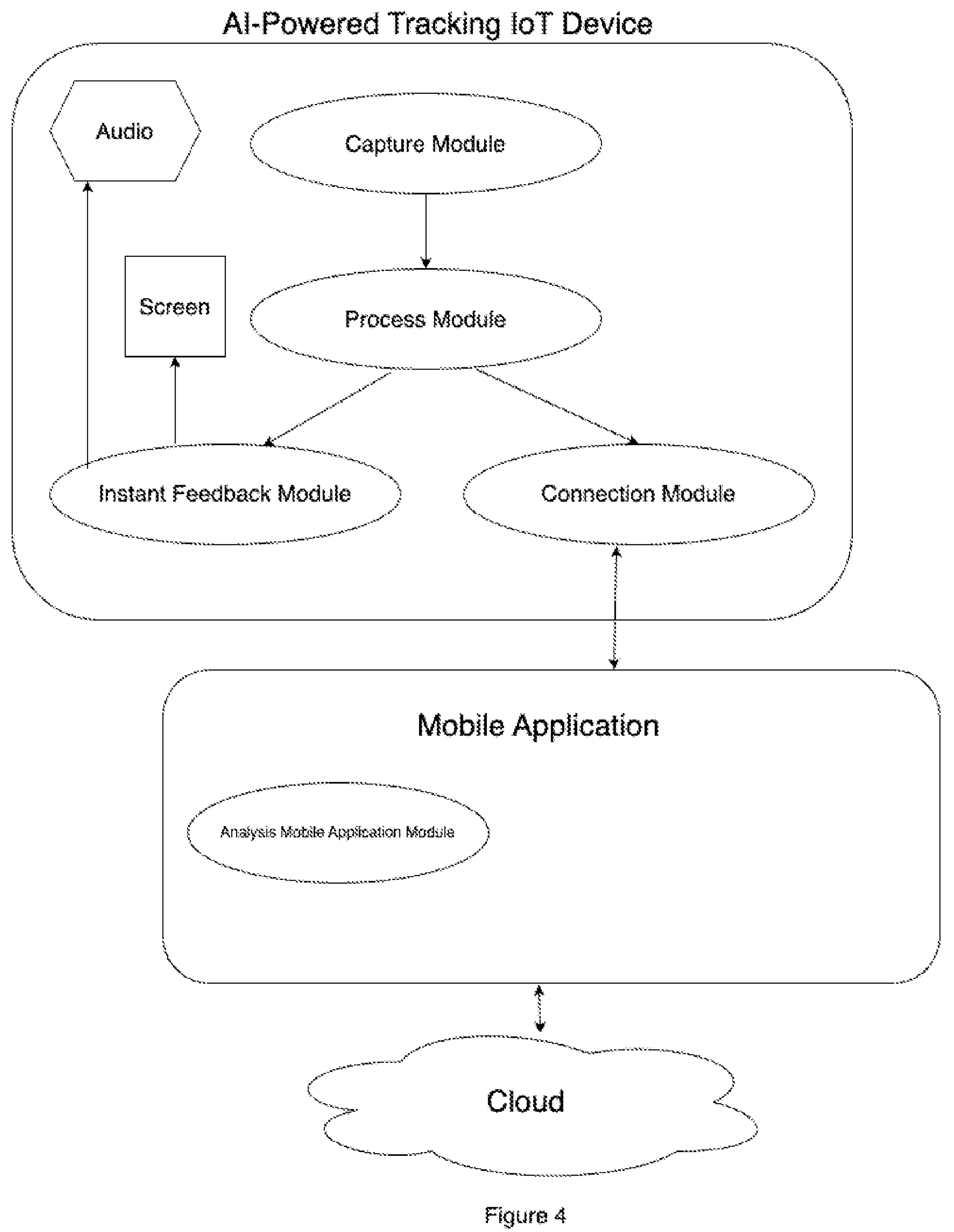
FIG. 4 is a block diagram of claim 5 with embodiment 1, 2, 3, 4, 5, 6, and 7 that includes mobile application to analyze the videos.
Figure 5:
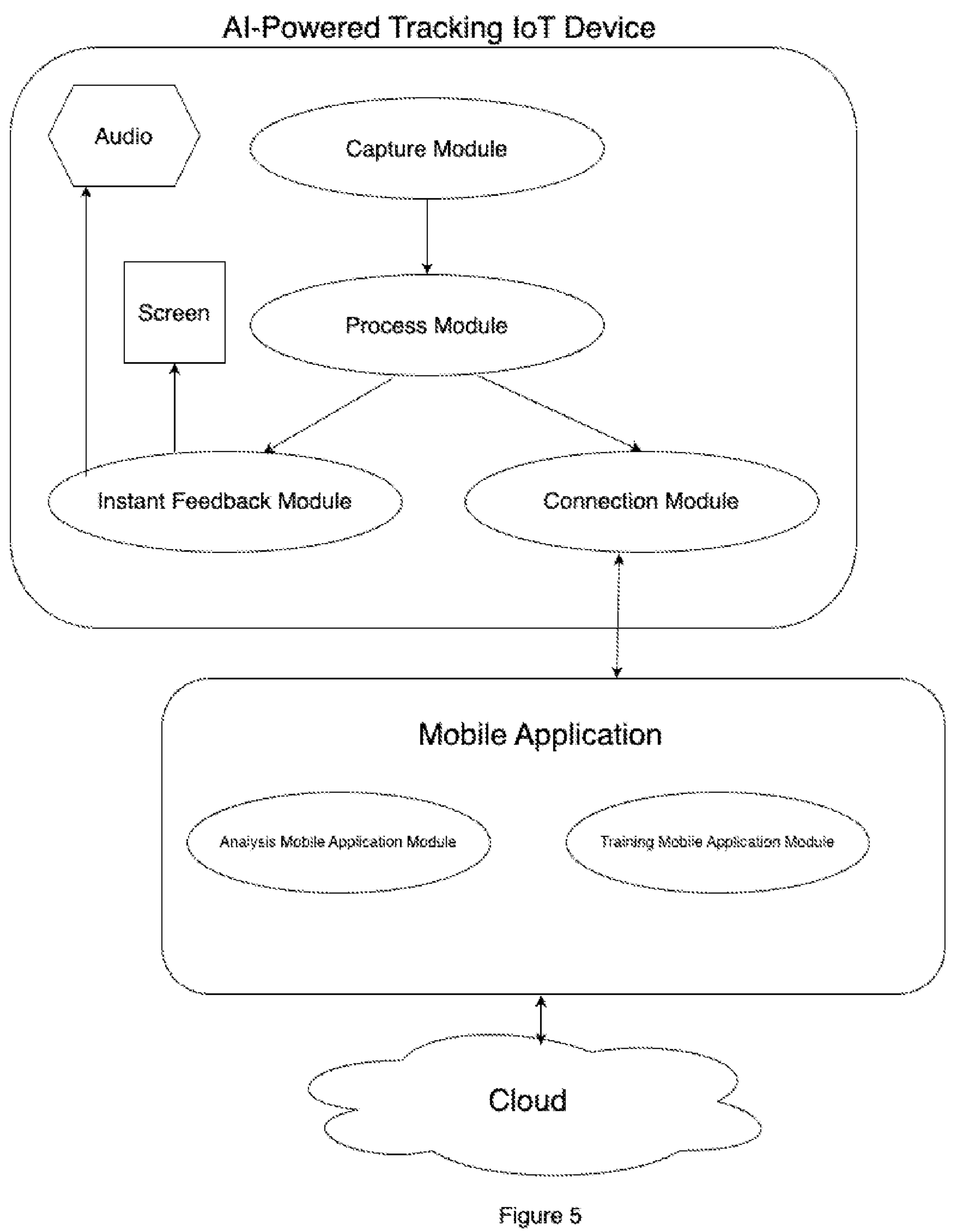
FIG. 5 is a block diagram of claim 6 with embodiment 1, 2, 3, 4, 5, 6, 7, 8, and 9 that includes mobile application to prepare and send training plans.
Figure 6:
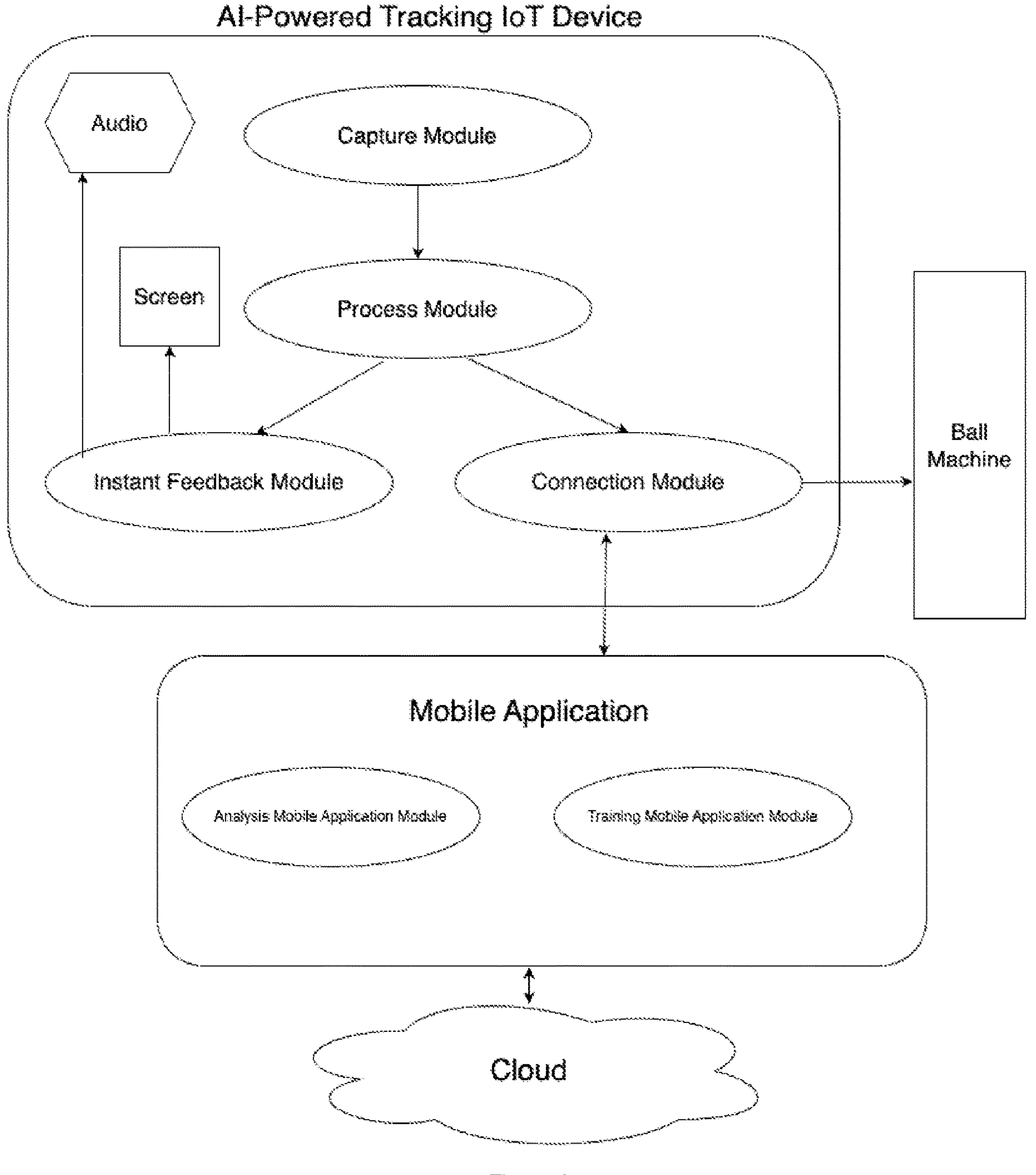
FIG. 6 is a block diagram of claim 7 with embodiment 1, 2, 3, 4, 5, 6, 7, 8, and 9 that includes sending the training plans be sent back to ball machine for execution.
Figure 7:
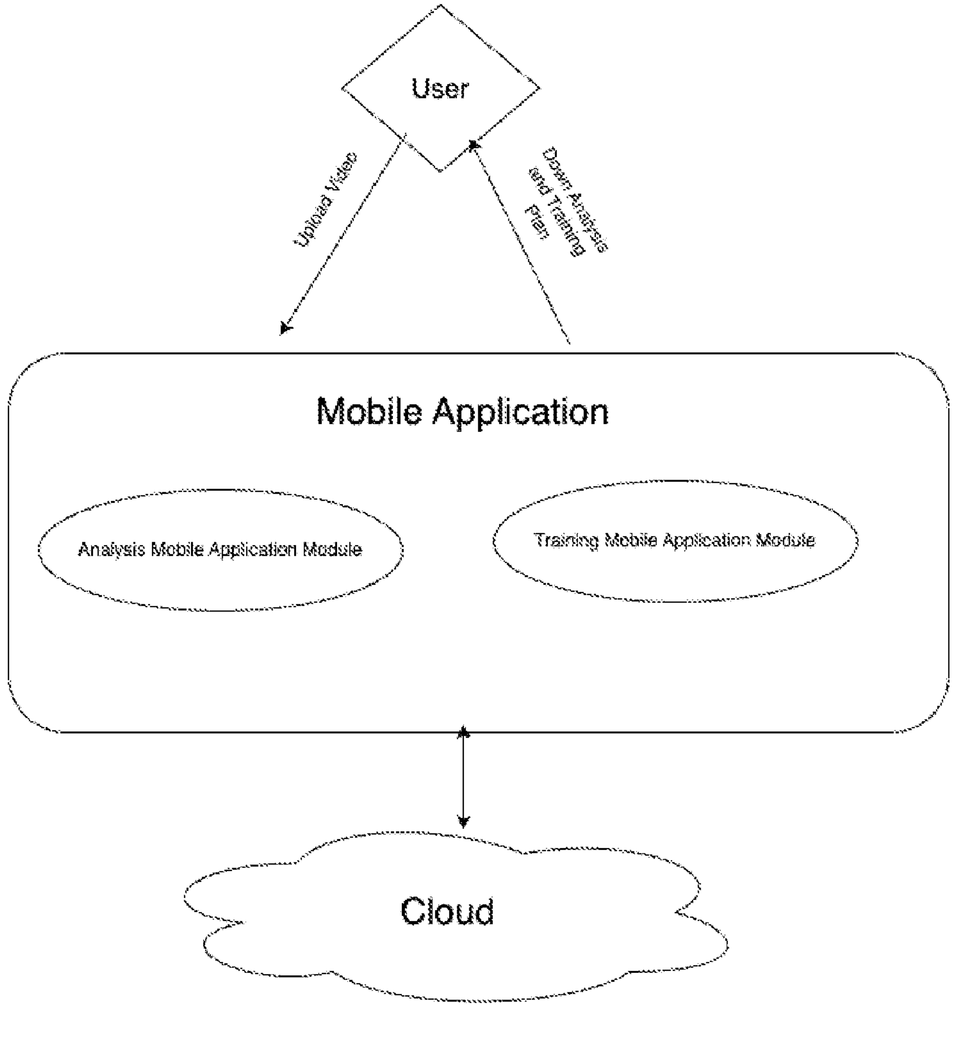
FIG. 7 is a block diagram of claim 8 with embodiment 7, 8, and 9 that includes mobile app, cloud, and user interaction for videos uploads and plan/recommendations downloads.

CourtAI is composed of multiple interconnected components:

1. An AI-Powered Tracking IoT Device has six modules.
   1.1. The Capture Module is designed to continuously record real-time video and sensor data during gameplay. Utilizing a combination of video cameras and sensors, this module captures and monitors player actions, racket alignment, and ball dynamics. The instantaneous data acquisition ensures meticulous analysis and immediate feedback during practice sessions. The tracking tool is not only portable and robust but also adaptable to any court setup.
   1.2. The Process Module is designed to analyze video data in real-time, offering actionable feedback on player performance and identifying potential injury risks.
   1.3. The Instant Feedback module provides players with real-time evaluations on a scale of 1-10 for various performance metrics. This feedback, presented visually on a screen and audibly through a speaker system, enhances the learning process and assists players in refining their techniques.
   1.4. The Connection Module is designed to connect with the mobile app, enabling the transmission of data for in-depth analysis. Additionally, it receives recommendations and training plans from the mobile app.
   1.5. The Screen Module is an integral part of the AI-Powered Tracking IoT Device, providing a visual display of recommendations. CourtAI's immediate visual feedback feature offers players a numerical evaluation, ranging from 1 to 10, on various performance facets during practice, ensuring real-time assessments and in-session adjustments. The system evaluates serve quality, shot accuracy, ball placements, and speed, delivering unbiased and real-time critiques. Instant feedback also includes separate evaluations for injury prevention, enriching the learning curve and empowering players to refine their skills and elevate their game.
   1.6. The Audio Module is integrated into the AI-Powered Tracking IoT Device for announcing recommendations via a speaker. The auditory feedback feature introduces interactive coaching during practice sessions, with AI-derived voice instructions guiding players, offering insights, and providing motivation based on analyzed data, enriching the training journey.
2. A mobile application synchronized with the cloud, processing both current and historical data to discern patterns and craft individualized training schedules.
   2.1. The mobile application functions as both a user interface and a data processing hub. It collects and processes data from the IoT device using sophisticated AI algorithms in the cloud. This data undergoes deep analysis in the cloud, leading to the formulation of personalized plans. The app then transmits these specific plans to the IoT device for direct implementation, presenting player data in a user-friendly format.
   2.2. A dynamically generated training schedule for players, crafted in the app through cloud computations, and relayed back to the interface for implementation.
   2.3. CourtAI autonomously designs personalized training agendas for players, based on their performance metrics and objectives. These evolving training schedules are perpetually fine-tuned based on player advancements, ensuring rigorous and fruitful training sessions.
   2.4. A dedicated cloud infrastructure for in-depth analysis. CourtAI utilizes a cloud-based infrastructure for profound analysis of player performance metrics. This setup facilitates extensive data processing and pattern identification, enabling the system to discern long-term trends and performance trajectories.

The invention claimed is:

1. A real-time analysis and injury prevention system for racket sports, comprising an AI-enhanced IoT device equipped with various cameras and sensors to capture and analyze video footage of sessions between a player and a ball machine in sports, processing footage to assess player performance and using artificial intelligence to generate personalized recommendations and training plans for performance improvement and injury risk mitigation based on player movements, racket position, and ball speed and trajectory; wherein the system further comprises a connection module configured to automatically transmit said generated personalized training plans directly to the ball machine to implement real-time physical adjustments to the ball machine's execution during the session.

2. The system of claim 1, further configured to provide individualized recommendations for two players simultaneously engaging with the ball machine.

3. The system of claim 1, wherein the IoT device includes a built-in screen for immediate visual feedback on performance metrics, rated on a scale from 1 to 10.

4. The system of claim 1, further comprising an integrated speaker system within the IoT device, designed to provide AI-generated instant voice feedback during sessions.

5. The system of claim 1, further including a mobile application that connects to the IoT device either wired or wirelessly, aggregating data from various sessions for a comprehensive analysis of player performance and identification of long-term trends and patterns.

6. The system of claim 1, further comprising a mobile application that connects to the IoT device through either a wired or wireless connection, designed to process, analyze, and display player data and generate personalized training programs.

7. The system of claim 6, further featuring connectivity with the ball machine to implement training plans generated by the mobile application.

8. A real-time analysis and injury prevention mobile application for racket sports that captures video footage of sessions between players and a ball machine, analyzing footage to evaluate player performance and using artificial intelligence to provide personalized recommendations and training plans for performance enhancement and injury risk reduction based on data on player movements, racket position, and ball speed and trajectory; wherein the mobile application is configured to automatically transmit said generated personalized training plans directly to the ball machine to implement real-time physical adjustments to the ball machine's execution during the session.

9. The system of claim 8, capable of analyzing real play sessions between players without a ball machine and providing similar personalized recommendations for each player.

* * * * *